US006910720B2

(12) United States Patent
Shimei et al.

(10) Patent No.: US 6,910,720 B2
(45) Date of Patent: Jun. 28, 2005

(54) CONNECTOR FOR USE IN COMBINING THE CONTENTS OF A PAIR OF CONTAINERS

(75) Inventors: Thomas M. Shimei, San Diego, CA (US); Gus G. Tseo, San Diego, CA (US)

(73) Assignee: Gen-Probe Incorporated, San Diego, CA (US)

( * ) Notice: Subject to any disclaimer, the term of this patent is extended or adjusted under 35 U.S.C. 154(b) by 87 days.

(21) Appl. No.: 10/215,976

(22) Filed: Aug. 9, 2002

(65) Prior Publication Data

US 2003/0030278 A1 Feb. 13, 2003

Related U.S. Application Data

(60) Provisional application No. 60/311,329, filed on Aug. 10, 2001.

(51) Int. Cl.[7] .................................................. F16L 25/00

(52) U.S. Cl. ........................................ 285/331; 285/397

(58) Field of Search .......................... 285/12, 239, 370, 285/397, 398, 371, 331; 141/364, 375

(56) References Cited

U.S. PATENT DOCUMENTS 3,156,272 A 11/1964 Indrunas
3,217,917 A 11/1965 George
3,266,533 A 8/1966 McHale
3,615,150 A 10/1971 Indrunas
3,620,267 A 11/1971 Seablom
3,857,423 A 12/1974 Ronca, Jr.
3,945,617 A 3/1976 Callery
4,068,346 A * 1/1978 Binder ...................... 16/110.1
4,493,348 A 1/1985 Lemmons
4,614,437 A * 9/1986 Buehler ...................... 366/130
4,834,152 A 5/1989 Howson et al.
4,969,565 A 11/1990 Justal et al.
4,986,322 A 1/1991 Chibret et al.
5,152,965 A 10/1992 Fisk et al.
5,186,358 A 2/1993 McVay
5,257,650 A * 11/1993 Fisk et al. ..................... 141/9
5,409,141 A 4/1995 Kikuchi et al.
5,423,791 A * 6/1995 Bartlett ....................... 604/403
5,454,805 A 10/1995 Brony
5,462,101 A 10/1995 Mouchmouchian
5,472,025 A 12/1995 Conrad et al.
5,501,841 A 3/1996 Lee et al.
5,534,228 A 7/1996 Wesseler
5,620,434 A 4/1997 Brony
5,702,019 A 12/1997 Grimard (Continued)

FOREIGN PATENT DOCUMENTS

CA 2048921 A1 2/1993
EP 0 770 561 A1 5/1997
WO WO 99/09931 A1 3/1999

OTHER PUBLICATIONS

Boehringer Mannheim, "Triglycerides/GB", System Pack Catalog Nos. 450032, 1126003 (R1), 1126004(R2), 917035; Date Unknown, p. 1–4.

*Primary Examiner*—Aaron Dunwoody
(74) *Attorney, Agent, or Firm*—Charles B. Cappellari

(57) ABSTRACT

A connector useful for combining the contents of a pair of containers which includes a hollow body for passing fluids between the containers. The body includes top and bottom end portions dimensioned to receive open-ended containers in an interference fit. The top end portion includes one or more recesses sized and arranged to facilitate drainage of a fluid from the first container into the second container when the first container is positioned above the second container. A middle portion is positioned between and adjoins the end portions of the body. A system for combining the contents of a pair of containers is formed when containers having substances to be combined are fitted onto the end portions of the connector.

38 Claims, 5 Drawing Sheets

U.S. PATENT DOCUMENTS

| | | | | | |
|---|---|---|---|---|---|
| 5,720,722 | A | * | 2/1998 | Lockridge | 604/74 |
| 5,740,654 | A | | 4/1998 | Manni et al. | |
| 5,871,110 | A | | 2/1999 | Grimard et al. | |
| 5,890,610 | A | | 4/1999 | Jansen et al. | |
| 5,921,419 | A | | 7/1999 | Niedospial, Jr. et al. | |
| 5,924,584 | A | | 7/1999 | Hellstrom et al. | |
| 5,925,029 | A | | 7/1999 | Jansen et al. | |
| 5,971,181 | A | | 10/1999 | Niedospial, Jr. et al. | |
| 6,003,702 | A | | 12/1999 | Grimard et al. | |
| 6,090,093 | A | | 7/2000 | Thibault et al. | |
| 6,106,502 | A | * | 8/2000 | Richmond | 604/246 |
| 6,168,037 | B1 | | 1/2001 | Grimard | |
| 6,206,860 | B1 | * | 3/2001 | Richmond | 604/246 |
| 6,213,994 | B1 | | 4/2001 | Jansen et al. | |
| 6,237,649 | B1 | | 5/2001 | Moisio et al. | |

* cited by examiner

CONNECTOR FOR USE IN COMBINING THE CONTENTS OF A PAIR OF CONTAINERS

This application claims the benefit of U.S. Provisional Application No. 60/311,329, filed on Aug. 10, 2001, the contents of which are hereby incorporated by reference herein.

FIELD OF THE INVENTION

The present invention relates to a connector for use in combining the contents of a pair of containers in a closed system. The present invention further relates to a kit comprising the connector and a pair of containers having distinct contents to be combind.

INCORPORATION BY REFERENCE

All references referred to herein are hereby incorporated by reference in their entirety. The incorporation of these references, standing alone, should not be construed as an assertion or admission by the inventors that any portion of the contents of all of these references, or any particular reference, is considered to be essential material for satisfying any national or regional statutory disclosure requirement for patent applications. Notwithstanding, the inventors reserve the right to rely upon any of such references, where appropriate, for providing material deemed essential to the claimed invention by an examining authority or court. No reference referred to herein is admitted to be prior art to the claimed invention.

BACKGROUND OF THE INVENTION

Procedures for determining the presence or absence of specific organisms or viruses in a test sample commonly rely upon nucleic acid-based probe testing. To increase the sensitivity of these tests, an amplification step is often included to increase the number of potential nucleic acid target sequences present in the test sample. During amplification, polynucleotide chains containing the target sequence or its complement are synthesized in a template-dependent manner from ribonucleoside or deoxynucleoside triphosphates using nucleotidyltransferases known as polymerases. There are many amplification procedures in common use today, including the polymerase chain reaction (PCR), Q-beta replicase, self-sustained sequence replication (3SR), transcription-mediated amplification (TMA), nucleic acid sequence-based amplification (NASBA), ligase chain reaction (LCR), strand displacement amplification (SDA) and loop-mediated isothermal amplification (LAMP), each of which is well known in the art. See, e.g., Mullis, "Process for Amplifying Nucleic Acid Sequences," U.S. Pat. No. 4,683,202; Erlich et al., "Kits for Amplifying and Detecting Nucleic Acid Sequences," U.S. Pat. No. 6,197,563; Walker et al., *Nucleic Acids Res.,* 20:1691–1696 (1992); Fahy et al., "Self-sustained Sequence Replication (3SR): An Isothermal Transcription-Based Amplification System Alternative to PCR," *PCR Methods and Applications,* 1:25–33 (1991); Kacian et al., "Nucleic Acid Sequence Amplification Methods," U.S. Pat. No. 5,399,491; Davey et al., "Nucleic Acid Amplification Process," U.S. Pat. No. 5,554,517; Birkenmeyer et al, "Amplification of Target Nucleic Acids Using Gap Filling Ligase Chain Reaction," U.S. Pat. No. 5,427,930; Marshall et al., "Amplification of RNA Sequences Using the Ligase Chain Reaction," U.S. Pat. No. 5,686,272; Walker, "Strand Displacement Amplification," U.S. Pat. No. 5,712,124; Notomi et al., "Process for Synthesizing Nucleic Acid," U.S. Pat. No. 6,410,278; Dattagupta et al., "Isothermal Strand Displacement Amplification," U.S. Pat. No. 6,214,587; and Helen H. Lee et al., Nucleic Acid Amplification Technologies: Application to Disease Diagnosis (1997).

Because polymerase activity is readily lost at ambient temperature, it is common to manufacture amplification kits which include polymerases that have been freeze-dried in formulations containing other necessary co-factors and substrates for amplification. See, e.g., Shen et al., "Stabilized Enzyme Compositions for Nucleic Acid Amplification," U.S. Pat. No. 5,834,254. Freeze-drying or lyophilization involves the removal of water from a frozen sample by sublimation under lower pressure. Sublimation is a process by which a solid is evaporated without passing through the liquid stage. Freeze-dried formulations containing polymerases are advantageous because they can be stored at ambient temperature and for prolonged periods of time without substantial losses of enzymatic activity.

Prior to use, dried polymerase formulations must be reconstituted with a reconstitution buffer, such as that disclosed by Shen et al., U.S. Pat. No. 5,834,254. Typically, the lyopholized product is provided in a vacuum-sealed glass bottle, and the buffer is separately provided in a plastic bottle or tube having a re-sealable cap. Reconstitution generally requires manually transferring the buffer from its container to the container holding the dried polymerase formulation, either by pipetting or pouring. The container holding the polymerase formulation is then swirled or otherwise agitated for a period of time sufficient to fully dissolve the dried material, after which time the reconstituted polymerase formulation is transferred back to the container which previously held the buffer. The container holding the reconstituted polymerase formulation is preferably a plastic container having a conically-shaped bottom to minimize waste when pipetting from the container. Plastic containers are preferred because they can be placed in sub-zero freezers for storage and are cheaper to manufacture than glass bottles. The reconstituted polymerase formulation may be used directly in an amplification procedure or sealed and stored for subsequent use.

The manual steps associated with commonly practiced polymerase reconstitution procedures raise two primary concerns. First, each of the manual steps involved in reconstituting dried polymerase formulations presents an opportunity for operator error and variability between reconstitutions, as the accuracy of reconstitutions depends upon precision pipetting or pouring by a practitioner. Second, open containers and manual transfer steps associated with such procedures provide an opportunity for practitioners to inadvertently contaminate reconstituted polymerase solutions with residual test material that may have been picked up from a laboratory workspace. This kind of contamination is especially undesirable since transferring even a minute amount of target-containing material from a workspace to a polymerase-containing solution could lead to the production of billions of target sequences in otherwise negative samples, thereby resulting in false-positives that would have tested negative in the absence of target amplification with the polymerases. Thus, it is an objective of the present invention to provide a manual method for reconstituting dried polymerase formulations in a manner which minimizes opportunities for operator error and contamination.

SUMMARY OF THE INVENTION

The present invention satisfies this objective by providing a connector for use in combining the contents of a pair of containers, where the connector comprises an elongated body having top and bottom end portions dimensioned to receive open ends of first and second containers, respectively, in an interference fit, a middle portion positioned between and adjoining the end portions of the body, and an inner surface defining a conduit through the body of the connector. The top end portion includes one or more recesses sized and arranged to facilitate drainage of a fluid from the first container into the second container by means of the conduit when the containers are fitted onto the end portions of the body and the first container is positioned above the second container. To facilitate drainage of a fluid from the first container into the second container, the recesses of the top end portion are preferably generally U-shaped and the end surface of the top end portion is preferably inwardly beveled.

In one embodiment of the present invention, the connector further comprises a collar having wall which extends radially outwardly from and generally perpendicular to an outer surface of the middle portion of the body. The radial wall may have a peripheral end surface adapted for manual manipulation or, alternatively, the collar may further comprise a peripheral end wall, where the radial wall distally terminates at and generally perpendicular to an inner surface of the peripheral end wall. In this latter embodiment, the peripheral end wall has an outer surface which preferably includes a series of spaced-apart ridges for gripping. To strengthen the peripheral end wall for manual manipulation, a plurality of spaced-apart support walls may be included which extend from and generally perpendicular to a top surface and/or a bottom surface of the radial wall and which extend radially outwardly from the outer surface of the middle portion of the body to the inner surface of the peripheral end wall. In the most preferred embodiment, the body has a generally cylindrical shape and the radial wall forms a ring structure which distally terminates at an annular end wall.

In another embodiment of the present invention, at least one of the end portions of the body of the connector proximally terminates at a shelf extending outwardly from the outer surface of the body, where each shelf may be defined by a top or bottom surface of the middle portion. Where the connector includes a collar, the shelf may be the top or bottom surface of the radial wall. Each shelf is sized and arranged so that a top surface at the open end of the first or second container is in touching contact with the shelf when the first and second containers are fitted onto the end portions of the body. In a preferred embodiment, each end portion of the body proximally terminates at a shelf. And in the most preferred embodiment, the shelf at the top end portion is perpendicular to the outer surface of the top end portion and the shelf at the bottom end portion is beveled relative to the outer surface of the bottom end portion.

In still another embodiment of the present invention, a connector is provided for use in combining the contents of a pair of containers, where the connector comprises an elongated body, a collar having a peripheral end wall and a skirt depending from a bottom surface of the peripheral end wall. The body includes an upper end portion dimensioned to receive an open end of a first container in an interference fit and a lower end portion adjoining the upper end portion. The collar includes a wall which extends radially outwardly from and generally perpendicular to an outer surface of the lower end portion and which distally terminates at and generally perpendicular to an inner surface of the peripheral end wall. The skirt is dimensioned to receive an open end of a second container in an interference fit. The upper end portion has an end surface which includes one or more recesses sized and arranged to facilitate drainage of a fluid from the first container into the second container by means of the conduit when the first and second containers are fitted onto the upper end portion and skirt, respectively, and the first container is positioned above the second container. To facilitate drainage of a fluid from the first container into the second container, the end surface of the upper end portion is preferably inwardly beveled and the recesses are preferably generally U-shaped.

In yet another embodiment of the present invention, the peripheral end wall of the skirted connector has an outer surface which includes a series of spaced-apart ridges for gripping. To strengthen the peripheral end wall for manual manipulation, a plurality of spaced-apart support walls are preferably included which extend from and generally perpendicular to a top surface of the radial wall and which extend radially outwardly from the outer surface of the lower end portion of the body to the inner surface of the peripheral end wall. In the most preferred embodiment, the body has a generally cylindrical shape and the radial wall forms a ring structure which distally terminates at an annular end wall.

In a further embodiment of the present invention, the upper end portion of the body proximally terminates at a top shelf, where the top shelf is defined by a top surface of the lower end portion of the body. The top shelf is sized and arranged so that a top surface of the open end of the first container is in touching contact with the top shelf when the first container is fitted onto the top end portion. In this embodiment, the skirt preferably proximally terminates at a bottom shelf, where the bottom shelf is defined by the bottom surface of the peripheral end wall. The top and bottom shelves are preferably generally perpendicular to the outer surfaces of the upper end portion and the skirt, respectively.

In still another embodiment, kits are provided which include any connector according to the present invention in packaged combination with at least one container holding a fluid substance (e.g., solvent or diluent) or solid material (e.g, powder, particles, granules, food product or tissue specimen). Preferably, the kits of this embodiment include a first container holding a lyophilized formulation containing at least one enzyme reagent (i.e., RNA or DNA polymerase) for use in amplifying a nucleic acid sequence and a second container holding a buffer for reconstituting the formulation. An example of a lyophilized formulation for performing a transcription-based amplification is one which comprises reverse transcriptase derived from Moloney murine leukemia virus and/or bacteriophage T7 RNA polymerase in at least one cryoprotectant excipient, such as trehalose or polyvinylpyrrolidone. The container holding the lyophilized formulation may further include, for example, nucleotide triphosphates, metal ions and co-factors necessary for enzymatic activity. Such formulations are disclosed by Shen et al., U.S. Pat. No. 5,834,254. These formulations can be reconstituted with a reconstitution buffer comprising 0.01% (v/v) TRITON® X-100, 41.6 mM $MgCl_2$, 1 mM $ZnC_2H_3O_2$, 10% (v/v) glycerol, 0.3% (v/v) ethanol, 0.02% (w/v) methyl paraben, and 0.01% (w/v) propyl paraben. Other enzyme-containing formulations and corresponding reconstitution buffers will be readily appreciated by those skilled in the art.

These and other features, aspects, and advantages of the present invention will become apparent to those skilled in the art after considering the following detailed description, appended claims and accompanying drawings.

DETAILED DESCRIPTION OF THE INVENTION

While the present invention may be embodied in a variety of forms, the following description and accompanying drawings are merely intended to disclose some of these forms as specific examples of the present invention. Accordingly, the present invention is not intended to be limited to the forms or embodiments so described and illustrated. Instead, the full scope of the present invention is set forth in the appended claims.

The figures illustrate preferred connectors 10, 50 of the present invention depicted alone or as part of a system 100, 200 which includes a first container 70 and a second container 80, 90. Connectors according to the present invention can be used to combine the contents of different containers which are preferably kept separate until use for reasons that may be related to, for instance, the stability or toxicity of the combined contents of the different containers. Containers that can be used with or that form a part of the present invention can be of any shape sufficient to hold the material of interest and which allows for attachment of the container to the connector in an interference fit. (As used herein, the term "interference fit" includes, but is not limited to, a frictional fit.) Likewise, the connectors of the present invention can be adapted to accommodate the shapes and sizes of the containers intended for use. The composition of the containers may be, for example, glass or plastic, and is preferably selected to be essentially inert with respect to the materials being combined, whether those materials are in their separated or combined state. The contents of container sets may form, by way of example, a lyophilized material/solvent combination, a concentrated solution/diluent combination or a combination of solutions which can be combined to form a new solution. After assembling a connector and associated containers, mixing may be achieved by repeated hand-inversion, or inversion and swirling, of the closed system.

Figure 4:
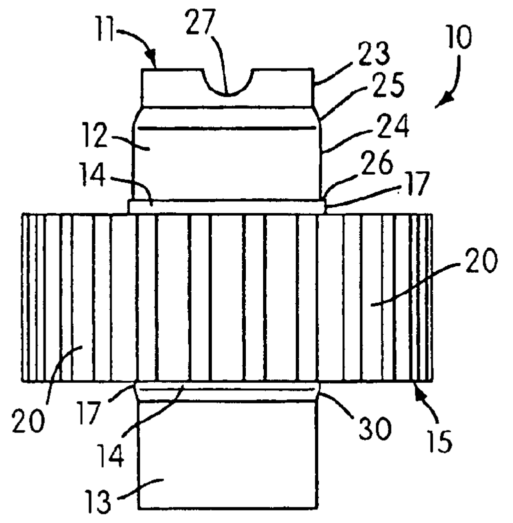
FIG. 4 is a side elevation view of the connector of FIG. 3.
Figure 5:
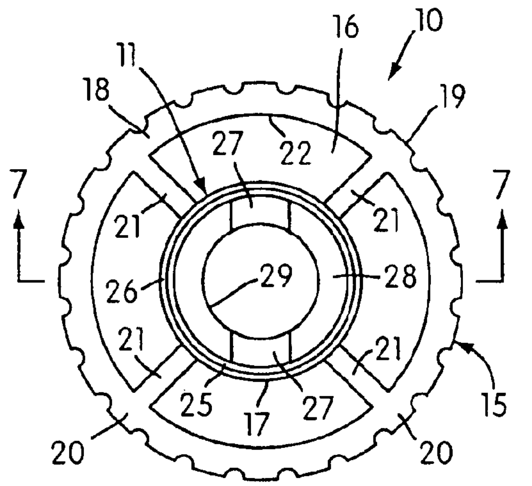
FIG. 5 is a top plan view of the connector of FIG. 3.
Figure 6:
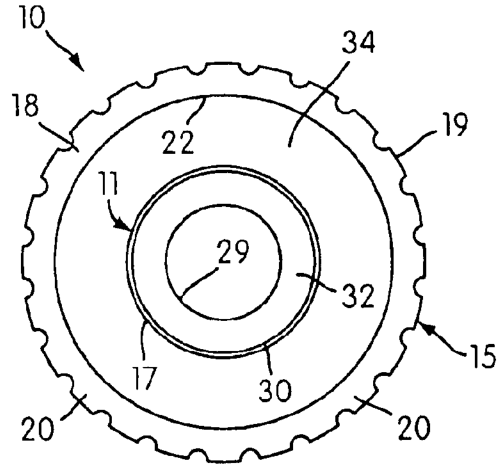
FIG. 6 is a bottom view of the connector of FIG. 3.

FIGS. 1–7 illustrate a preferred connector 10 of the present invention which includes a generally cylindrical body 11 having of a top end portion 12, a bottom end portion 13 and a middle portion 14 adjacent to and separating the top and bottom end portions. To facilitate handling of the connector 10, and to limit potentially contaminating user contact with the top and bottom end portions 12, 13, the connector, as illustrated in FIGS. 3–7, is provided with a collar 15 having a wall 16 which extends radially outward from and generally perpendicular to an outer surface 17 of the middle portion 14 of the body 11. The radial wall 16 distally terminates at and generally perpendicular to an inner surface 22 of an annular end wall 18 having an annular end surface 19 which may be adapted for manual manipulation. The annular end surface 19 preferably includes a series of spaced-apart ridges 20 for manually gripping the collar 15. To further strengthen the collar 15 for manual manipulation, a plurality of spaced-apart support walls 21 can be provided which extend upward from a top surface 31 of the radial wall 16 and radially outwardly from the outer surface 17 of the middle portion 14 to the inner surface 22 of the annular end wall 18, as shown in FIG. 5. In a preferred embodiment, four such spaced-apart support walls 21 are included.

Figure 11:
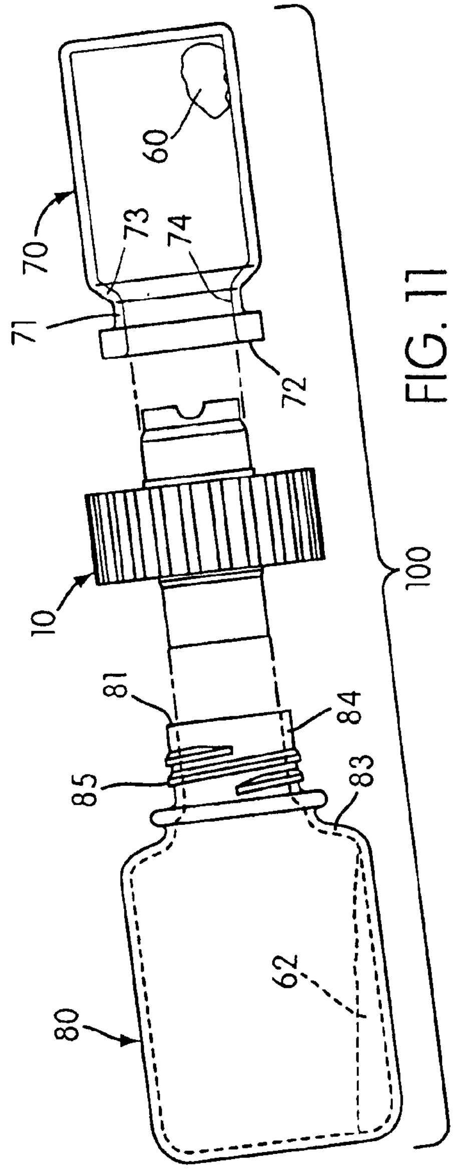
FIG. 11 is an exploded side view of the connector of FIG. 3 in combination with a first container containing a solid material and a second container containing a solvent for dissolving the solid material of the first container.
Figure 12:
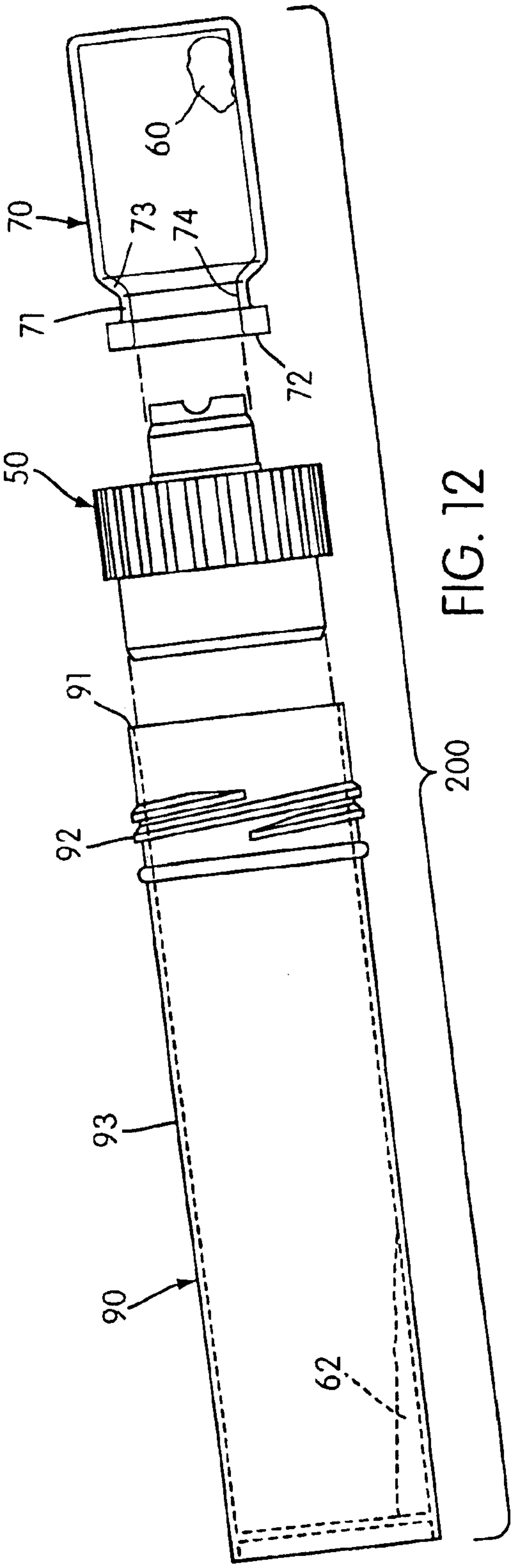
FIG. 12 is an exploded side view of the connector of FIG. 8 in combination with a first container containing a solid material and a second container containing a solvent for dissolving the solid material of the first container.
Figure 13:
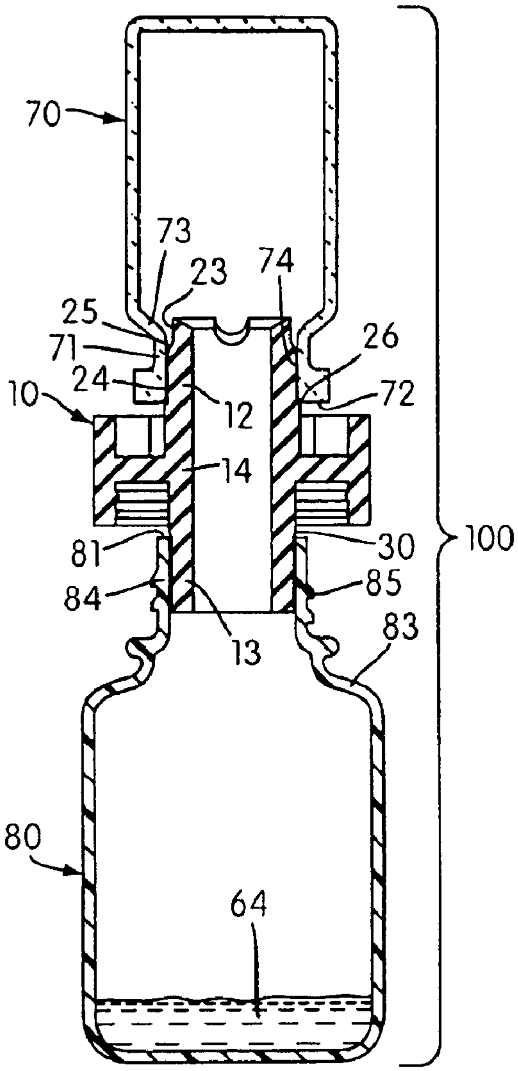
FIG. 13 is a section side view of a closed system which includes the connector and attached containers of FIG. 11 with dissolved material in the second container.

The top end portion 12 of the connector 10 depicted in FIGS. 1–4 includes a distal section 23 and a proximal section 24 having different circumferences, with the circumference of the distal section being smaller than the circumference of the proximal section. The distal and proximal sections 23, 24 are connected by a beveled section 25 of the top end portion 12. This particular configuration facilitates attachment of an open-ended container 70 (e.g., glass bottle) to the top end portion 12, as shown in FIG. 13. Specifically, the circumference of the distal section 23 is slightly smaller than the inner circumference of a neck 71 which depends from an annular top surface 72 of the container 70, the annular top surface defining a mouth of the container, and the circumference of the proximal section 24 is slightly larger than the inner circumference of the neck of the container. (The difference between the circumference of the proximal section 24 of the top end portion 12 and the inner circumference of the neck 71 of the container 70 will depend upon the degree of friction desired between the top end portion and the container and can be readily adapted by those skilled in the art.) In this way, the distal section 23 can be easily guided into the mouth of the container 70, while the proximal section 24 provides sufficient resistance to permit the formation of a frictional fit between the top end portion 12 and the container. To regulate how far the container 70 can be extended onto the top end portion 12, the proximal section 24 preferably proximately terminates at an outwardly extending, annular top shelf 26 (see FIGS. 1–5 and 7) defined by a top surface of the middle portion 14 of the body 11. The top shelf 26 functions as a stop to the annular top surface 72 of the container 70 when the container is fitted onto the top end portion 12 of the connector 10. The top shelf 26 is preferably substantially perpendicular to the outer surface 17 of the top end portion 12 of the body 11, especially where the juncture formed by the annular top surface 72 and an inner surface 74 of the neck 71 of the container 70 is rounded rather than squared, as shown in FIGS. 11 and 12. Nevertheless, the top shelf 26 may be of any shape adequate to arrest movement of the container 70 as it is fitted onto the top end portion 12 of the body 11.

Figure 7:
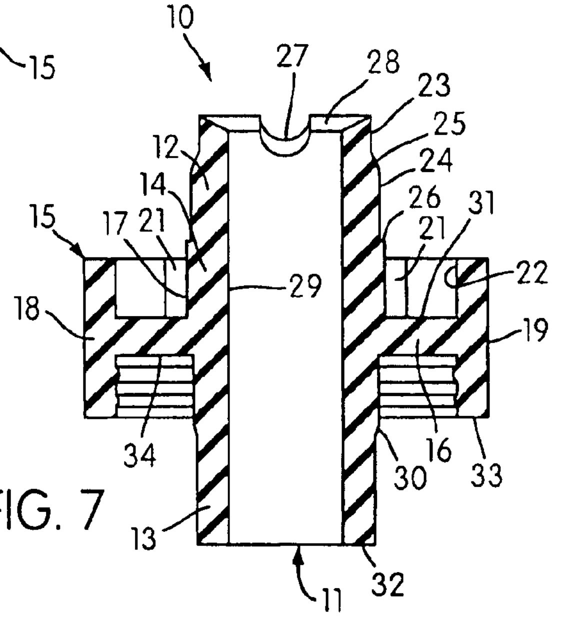
FIG. 7 is a section side view of the connector of FIG. 5, taken along the 7—7 line thereof.

In addition to facilitating attachment of the container 70 to the connector 10, the configuration of the top end portion 12 illustrated in FIGS. 1–4 and 7 also promotes fluid drainage from the container 70 by providing one or more recesses 27 which depend from an annular top surface 28 of the top end portion. As shown in FIG. 13, a small space exists between the distal section 23 of the top end portion 12 of the connector 10 and a shoulder 73 of the container 70 when the container is fully fitted onto the top end portion. (This configuration is especially appropriate for containers having short neck portions, since a connector having a top end portion which fits only partially into a short neck portion might be inadequate to stabilize a container on the connector for mixing.) Fluid which accumulates in this space when the connector 10 is in the vertical orientation depicted in FIG. 13 can be drained through a conduit in fluid communication with the first and second containers 70, 80 which is defined by an inner surface 29 of the body 11 of the connector 10. The recesses 27, which are preferably two opposed U-shaped recesses, are constructed to terminate in the distal section 23 just above the beveled section 25 (see FIG. 4) to facilitate adequate drainage of fluid from the container 70, but may extend into the proximal section 24 and/or beveled section of the top end portion 12, provided the recesses do not extend to or below the annular top surface 72 of the container when the container is fully fitted onto the top end portion and the closed system 100 is in the vertical orientation shown in FIG. 13. To further facilitate fluid drainage from the container 70, the annular top surface 28 of the top end portion 12 is beveled inwardly, as shown in FIG. 7. Substantially complete drainage from the container 70 is particularly important where, for instance, the materials being combined are costly to produce or acquire or where the precise volume of the final mixture is critical to a subsequent use.

Figure 1:
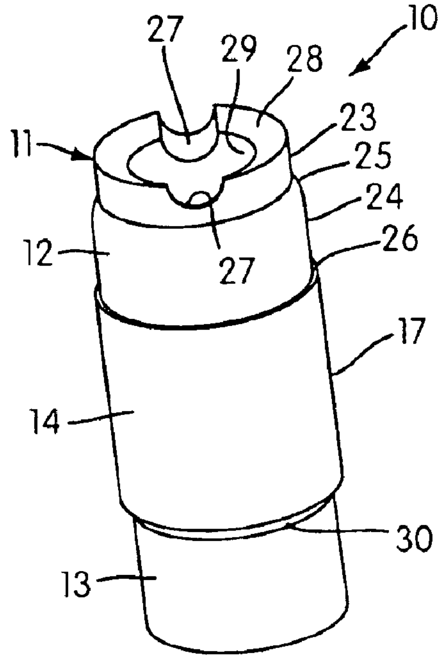
FIG. 1 is an enlarged perspective view of a preferred connector according to the present invention.
Figure 2:
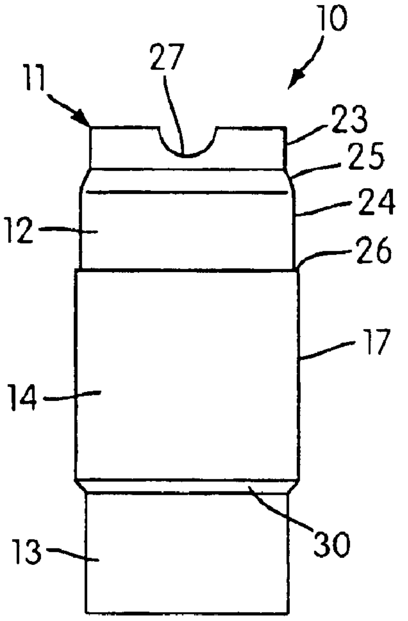
FIG. 2 is a side elevation view of the connector of FIG. 1.
Figure 3:
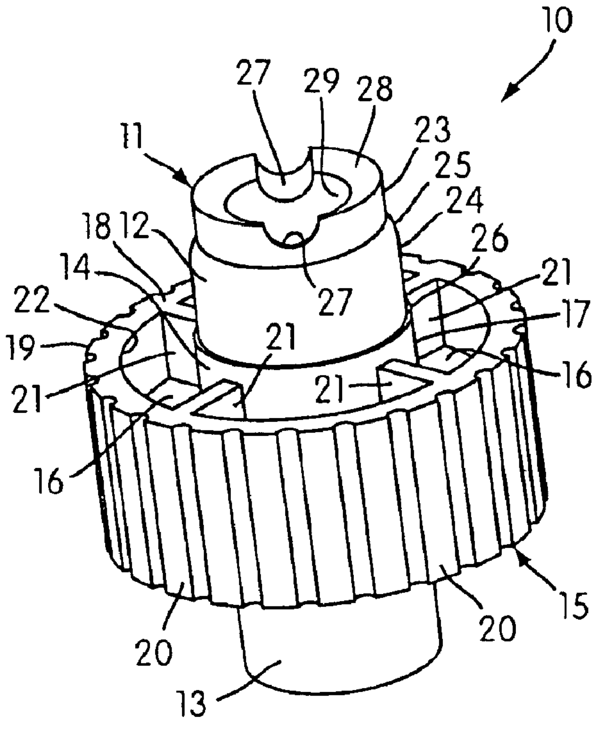
FIG. 3 is an enlarged perspective view of another preferred connector according to the present invention which includes a collar.

FIGS. 2, 4, 6 and 7 show the bottom end portion 13 of the connector 10 which is dimensioned to receive an open-ended container 80, preferably a plastic bottle having a neck portion 84, in a frictional fit. Similar to the top end portion 12 of the connector 10, the bottom end portion 13 proximately terminates at an outwardly extending, annular bottom shelf 30 defined by a bottom surface of the middle portion 14 of the body 11. The bottom shelf 30 functions as a stop to an annular top surface 81 of the container 80 when the container is fitted onto the bottom end portion 13 of the connector 10, thereby limiting how far the container can be extended onto the bottom end portion, as shown in FIG. 13. The bottom shelf 30 is preferably rounded, as illustrated in FIGS. 2, 4 and 7, to aid in stopping the container 80 at the juncture of the annular top surface 81 and the neck 84 when the container is fitted onto the bottom end portion 13. However, in an alternative embodiment, the shelf 30 may be substantially perpendicular to the outer surface 17 of the bottom end portion 13 of the body 11. When the container 80 is fully fitted onto the bottom end portion 13 of the connector 10, an annular bottom surface 32 of the bottom end portion is situated above a shoulder 83 and circumscribed by the neck 84 of the container 80, as shown in FIG. 13, thereby promoting fluid drainage from the container 80 and through the conduit defined by the inner surface 29 of the body 11 during mixing. In one preferred embodiment, the neck 84 of the container 80 is provided with helical threads 85, or other attachment means, so that the container 80 can be re-sealed with a cap for storage or immobilized within an automated instrument (not shown) for access by a robotic pipettor in a preferably closed environment.

Figure 8:
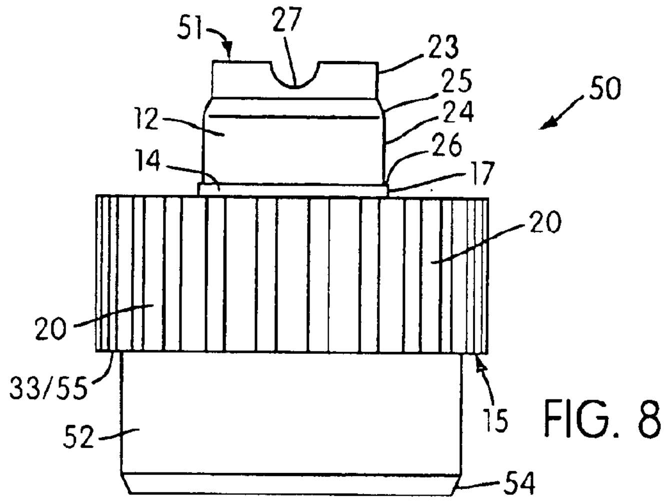
FIG. 8 is an enlarged side elevation view of yet another preferred connector according to the present invention which includes a collar and a skirt.
Figure 9:
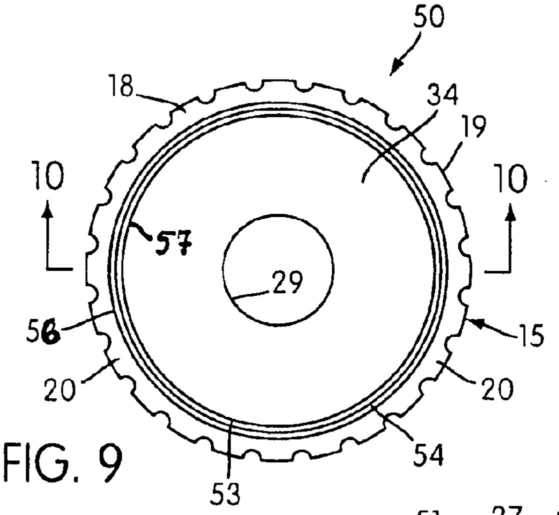
FIG. 9 is a bottom view of the connector of FIG. 8.
Figure 10:
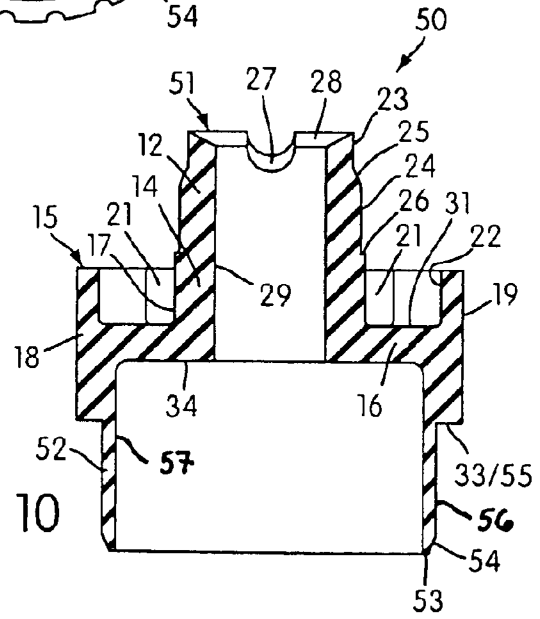
FIG. 10 is a section side view of the connector of FIG. 9, taken along the 10—10 line thereof.

FIGS. 8–10 illustrate another preferred connector 50 of the present invention which differs from the connector 10 shown in FIGS. 1–7 in two primary respects. First, the body 51 of this connector 50 does not include the bottom end portion 13 of the connector 10 described above. Second, the bottom end portion of this connector 50 is replaced with an annular skirt 52 which depends from a bottom surface 33 of the annular end wall 18 and is dimensioned to receive an open-ended container 90, preferably a tube-shaped container (e.g., test tube or vial), in a frictional fit. Thus, the connector 50 according to this aspect of the present invention includes inter alia the generally cylindrical body 11 having of the top end portion 12 (referred to in this embodiment as the "upper end portion"), the middle portion 14 (referred to in this embodiment as the "lower end portion") adjoining the upper end portion, the collar 15 having a wall 16 which extends radially outward from the outer surface 17 of the lower end portion 14, the annular end wall 18 having the annular end surface 19 adapted for manual manipulation, and the skirt 52. The lower end portion 14 of connector 50 illustrated in FIGS. 8–10 is truncated relative to the corresponding middle portion of the connector 10 illustrated in FIGS. 1–7, terminating at a surface co-extensive with a bottom surface 34 of the radial wall 16 of the collar 15.

To guide and accommodate attachment of the container 90 onto the skirt 52 in a frictional fit, a bottom surface 53 of the skirt is configured to include a bevel 54. Additionally, the skirt 52 of this embodiment proximately terminates at an outwardly extending, annular bottom shelf 55 defined by the bottom surface 33 of the annular end wall 18. The bottom shelf 55 functions as a stop to an annular top surface 91 at the mouth of the container 90 when it is fitted onto the skirt 52 of the connector 50. The bottom shelf 55 is preferably substantially perpendicular to an outer surface 56 of the skirt 52. In a preferred embodiment, the width of the bottom shelf 55 is at least as great as the width of the annular top surface 91 of the container 90.

Figure 14:
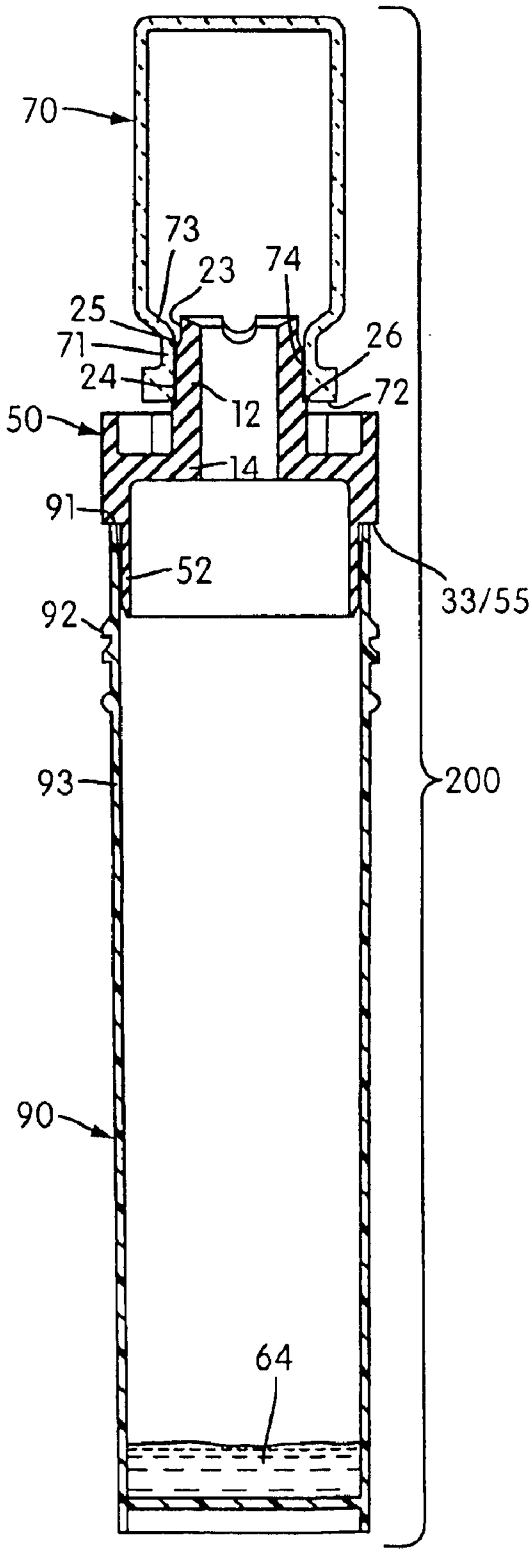
FIG. 14 is a section side view of a closed system which includes the connector and attached containers of FIG. 12 with dissolved material in the second container.

In another embodiment not shown, an inner surface 57 of the skirt 52 may be configured to receive and immobilize a container for mixing. For example, the inner surface 57 of the skirt 52 may be provided with helical threads which are arranged to mate with helical threads 92 positioned on an outer surface 93 of the container 90, where the threads 92 are positioned near the mouth of the container 90, as shown in FIG. 12, and the mouth of the container is defined by the annular top surface 91. Thus, the container 90 could be secured onto the skirt 52 of this embodiment by means of screwing the container into the skirt until forward movement the annular top surface 91 is arrested by contact with the bottom surface 34 of the collar 15. Notwithstanding, the substantially leak-proof seal provided by the connector 50 embodiment depicted in FIGS. 10, 12 and 14 is preferred.

For both illustrated connectors 10, 50, attachment of the containers 70, 80, 90 onto the connectors prior to mixing is illustrated in FIGS. 11 and 12. In these illustrations, the upper containers 70 include a solid material 60 (e.g., lyophilized reagent) to be dissolved by a fluid substance 62 (e.g., reconstitution buffer) present in the lower containers 80, 90. The containers 70, 80, 90 are attached to the connectors 10, 50 in a frictional fit, thereby forming substantially leak-proof, closed systems 100, 200 (see FIGS. 13 and 14), hand-mixed by inverting the systems 100, 200 an appropriate number of times to dissolve the solid material 60, and then vertically aligned so that a mixed fluid 64 can drain into the container of interest. FIGS. 13 and 14 show preferred arrangements, in which the containers 80, 90 which had previously held the fluid substance 62 are situated vertically below the containers 70 that had previously held the solid material 60, so that the final mixed fluid 64 drains into the bottle-shaped container 80 or the tube-shaped container 90 for subsequent use. As with the bottle-shaped container 80 above, the tube-shaped container 90 may include helical threads 92, or other attachment means, on the outer surface 93 near the mouth of the container 90, as shown in FIG. 12, so that the container 90 can be re-sealed with a cap for storage or for immobilizing the container 90 within an automated instrument (not shown) for access by a robotic pipettor in a preferably closed environment.

Connectors of the present invention are preferably formed as a unitary piece from a thermoplastic elastomer (TPE) or a thermoplastic rubber (TPR). TPEs differ from TPRs in that they have higher mechanical strength, but less elongation and fatique resistance. TPEs include elastomeric polyurethane, polyester and nylon. TPRs are generally polyolefin-based or styrene-based. The olefin-based materials have good chemical resistance, while the styrene-based materials are less expensive (but cannot withstand temperatures above about 120° F.). Particularly preferred for the present invention is a TPR sold under the product name KRATON™ G7720-9 (The KRATON Polymer Business; Houston, Tex.). The connectors can be molded using injection molding procedures well-known to those skilled in the art and in accordance with specifications that take into account the dimensions of the containers to be used in conjunction with the connectors, especially surface dimensions that will come into contact with the connectors, as well as the degree of friction desired.

While the present invention has been described and shown in considerable detail with reference to certain preferred embodiments, those skilled in the art will readily appreciate other embodiments of the present invention. Accordingly, the present invention is deemed to include all modifications and variations encompassed within the spirit and scope of the following appended claims.

What we claim is:

1. A connector for use in combining the contents of a pair of containers, the connector having an elongated body which comprises:

inner and outer surfaces, the inner surface defining a conduit through the body;

top and bottom end portions dimensioned to receive open ends of first and second containers, respectively, in an interference fit, a distal section of the top end portion having an end surface which includes two or more generally U-shaped recesses sized and arranged to facilitate drainage of a fluid from the first container into the second container by means of the conduit when the containers are fitted onto the end portions and the first container is positioned above the second container; and a middle portion positioned between and adjoining the end portions.

2. The connector of claim 1, wherein the end surface of the top end portion is inwardly beveled to facilitate drainage of a fluid through the conduit when the first and second containers are fitted onto the top and bottom end portions, respectively, and when the first container is positioned above the second container.

3. The connector of claim 1 further comprising a collar having a radial wall extending outwardly from and generally perpendicular to the outer surface of the middle portion, the radial wall having top and bottom surfaces.

4. The connector of claim 3, wherein the radial wall has a peripheral end surface adapted for manual manipulation.

5. The connector of claim 3, wherein the collar further comprises a peripheral end wall, and wherein the radial wall distally terminates at and generally perpendicular to an inner surface of the peripheral end wall.

6. The connector of claim 5, wherein the peripheral end wall has an outer surface comprising a series of spaced-apart ridges for gripping.

7. The connector of claim 5, wherein the collar includes a plurality of spaced-apart support walls which extend from and generally perpendicular to at least one of the top and bottom surfaces of the radial wall and which extend radially outwardly from the outer surface of the middle portion to the inner surface of the peripheral end wall.

8. The connector of claim 5, wherein the body has a generally cylindrical shape and the peripheral end wall has a generally annular shape.

9. The connector of claim 1, wherein at least one of the end portions proximally terminates at a shelf defined by a top or bottom surface of the middle portion, wherein the shelf is sized and arranged so that a top surface at the open end of the first or second container is in touching contact with the shelf when the first and second containers are fitted onto the end portions.

10. The connector of claim 1, wherein the top end portion proximally terminates at a top shelf defined by a top surface of the middle portion, wherein the top shelf is sized and arranged so that a top surface at the open end of the first container is in touching contact with the top shelf when the first container is fitted onto the top end portion.

11. The connector of claim 10, wherein the bottom end portion proximally terminates at a bottom shelf defined by a bottom surface of the middle portion, wherein the bottom shelf is sized and arranged so that a top surface at the open end of the second container is in touching contact with the bottom shelf when the second container is fitted onto the bottom end portion.

12. The connector of claim 3, wherein at least one of the end portions proximally terminates at the top or bottom surface of the radial wall, such that a top surface at the open end of at least one of the first and second containers contacts the top or bottom surface of the radial wall when the first and second containers are fitted onto the end portions.

13. The connector of claim 1, wherein the connector is an integrally molded elastomer.

14. A connector for use in combining the contents of a pair of containers, the connector comprising:

an elongated body having inner and outer surfaces, the inner surface defining a conduit through the body, wherein the body includes:

an upper end portion dimensioned to receive an open end of a first container in an interference fit; and a lower end portion adjoining the upper end portion;

a collar having a peripheral end wall and a radial wall which extends from and generally perpendicular to an outer surface of the lower end portion and which distally terminates at and generally perpendicular to an inner surface of the peripheral end wall;

a skirt depending from a bottom surface of the peripheral end wall, the skirt being dimensioned to receive an open end of a second container in an interference fit, wherein a distal section of the upper end portion has an end surface which includes two or more generally U-shaped recesses sized and arranged to facilitate drainage of a fluid from the first container into the second container by means of the conduit when the first container is fitted onto the upper end portion and the second container is fitted onto the skirt and when the first container is positioned above the second container.

15. The connector of claim 14, wherein the end surface of the upper end portion is inwardly beveled to facilitate drainage of a fluid through the conduit when the first and second containers are fitted onto the upper end portion and the skirt, respectively, and the first container is positioned above the second container.

16. The connector of claim 14, wherein the peripheral end wall has an outer surface comprising a series of spaced-apart ridges for gripping.

17. The connector of claim 14, wherein the collar includes a plurality of spaced-apart support walls which extend from and generally perpendicular to a top surface of the radial wall and which extend radially outwardly from the outer surface of the lower end portion to the inner surface of the peripheral end wall.

18. The connector of claim 14, wherein the upper end portion proximally terminates at a top shelf defined by a top surface of the lower end portions wherein the top shelf is sized and arranged so that a top surface at the open end of the first container is in touching contact with the top shelf when the first container is fitted onto the upper end portion.

19. The connector of claim 14, wherein the skirt proximally terminates at a bottom shelf defined by the bottom surface of the peripheral end wall, wherein the bottom shelf is sized and arranged so that a top surface at the open end of the second container is in touching contact with the bottom shelf when the second container is fitted onto the skirt.

20. The connector of claim 18, wherein the skirt proximally terminates at a bottom shelf defined by the bottom surface of the peripheral end wall, wherein the bottom shelf is sized and arranged so that a top surface at the open end of the second container is in touching contact with the bottom shelf when the second container is fitted onto the skirt.

21. The connector of claim 14, wherein the upper end portion proximally terminates at a top surface of the radial wall, such that a top surface at the open end of the first container contacts the top surface of the radial wall when the first container is fitted onto the upper end portion.

22. The connector of claim 14, wherein the body has a generally cylindrical shape and the peripheral end wall has a generally annular shape.

23. The connector of claim 14, wherein the connector is an integrally molded elastomer.

24. A kit comprising the connector of claim 1 and first and second open-mouthed containers holding substances which can be combined.

25. The kit of claim 24, wherein the first container holds a solvent or diluent which can be used to dissolve or dilute the substance held by the second container.

26. The kit of claim 24, wherein the first container holds a lyophilized enzyme reagent formulation and the second container holds a buffer for reconstituting the lyophilized enzyme reagent formulation.

27. The kit of claim 26, wherein the lyophilized enzyme reagent formulation includes a polymerase for use in amplifying a nucleic acid sequence.

28. The kit of claim 27, wherein the polymerase is an RNA polymerase.

29. A kit comprising the connector of claim 3 and first and second open-mouthed containers holding substances which can be combined.

30. The kit of claim 29, wherein the first container holds a solvent or diluent which can be used to dissolve or dilute the substance held by the second container.

31. The kit of claim 29, wherein the first container holds a lyophilized enzyme reagent formulation and the second container holds a buffer for reconstituting the lyophilized enzyme reagent formulation.

32. The kit of claim 31, wherein the lyophilized enzyme reagent formulation includes a polymerase for use in amplifying a nucleic acid sequence.

33. The kit of claim 32, wherein the polymerase is an RNA polymerase.

34. A kit comprising the connector of claim 14 and first and second open-mouthed containers holding substances which can be combined.

35. The kit of claim 34, wherein the first container holds a solvent or diluent which can be used to dissolve or dilute the substance held by the second container.

36. The kit of claim 34, wherein the first container holds a lyophilized enzyme reagent formulation and the second container holds a buffer for reconstituting the lyophilized enzyme reagent formulation.

37. The kit of claim 36, wherein the lyophilized enzyme reagent formulation includes a polymerase for use in amplifying a nucleic acid sequence.

38. The kit of claim 37, wherein the polymerase is an RNA polymerase.

* * * * *